United States Patent
Ishigami et al.

(10) Patent No.: US 7,683,516 B2
(45) Date of Patent: Mar. 23, 2010

(54) PRODUCTION METHOD FOR ROTATING ELECTRIC MACHINE AND STATOR COILS, AND ELECTRIC POWER STEERING MOTOR

(75) Inventors: Takashi Ishigami, Hitachinaka (JP); Masashi Kitamura, Mito (JP); Osamu Koizumi, Ibaraki (JP); Mitsuaki Mirumachi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 11/441,134

(22) Filed: May 26, 2006

(65) Prior Publication Data
US 2006/0279146 A1 Dec. 14, 2006

(30) Foreign Application Priority Data
May 30, 2005 (JP) .............................. 2005-156504

(51) Int. Cl.
*H02K 1/00* (2006.01)
(52) U.S. Cl. ..................................... 310/179
(58) Field of Classification Search ................ 310/258, 310/259, 216, 218, 179; 29/596
See application file for complete search history.

(56) References Cited

U.S. PATENT DOCUMENTS 5,583,387 A * 12/1996 Takeuchi et al. ............ 310/217
5,729,072 A * 3/1998 Hirano et al. ............... 310/258
6,127,753 A * 10/2000 Yamazaki et al. ............. 310/71

FOREIGN PATENT DOCUMENTS

| JP | 6-133501 A | 5/1994 |
| JP | 2547131 B2 | 8/1996 |
| JP | 10-271718 A | 10/1998 |
| JP | 11-18331 A | 1/1999 |
| JP | 3355700 B2 | 10/2002 |
| JP | 3430521 B2 | 5/2003 |

OTHER PUBLICATIONS

Chinese office action dated Sep. 12, 2008 with English translation.

* cited by examiner

Primary Examiner—Javaid Nasri
(74) Attorney, Agent, or Firm—Crowell & Moring LLP

(57) ABSTRACT

A stator of a rotating electric machine includes a stator core, and multiphase stator coils incorporated in the stator core. The stator core is formed by connecting a plurality of split core pieces. Each of the stator coils is wound around a coil bobbin installed on the outer periphery of the tooth portion of a respective one of the core pieces, by a concentrated winding method; and around mutually adjacent tooth portions, the respective coils that have the same phase and mutually different in the winding direction are continuously wound. A crossover wire for connecting the first stator coil wound around the first tooth portion and the second stator coil wound around the second tooth portion, is located at a position further toward the central side in the axial direction of the coil bobbin than the end portion of the coil bobbin, inclusive of this end portion.

10 Claims, 11 Drawing Sheets

PRODUCTION METHOD FOR ROTATING ELECTRIC MACHINE AND STATOR COILS, AND ELECTRIC POWER STEERING MOTOR

BACKGROUND OF THE INVENTION

1. Field of the Invention

The present invention relates to a production method for rotating electric machinery such as motors and generators, and stator coils, and to electric power steering motors. More specifically, the present invention pertains to a production method for a rotating electric machine and stator coils, and an electric power steering motor that are suitable for ones having split stator cores.

2. Description of the Related Art

Two types of rotating electric machines have been conventionally known in which a stator core is split into a plurality of parts and in which coils are concentratedly wound on each tooth. One of these types is, as disclosed in, for example, Japanese Patent Nos. 3355700 and 3430521, a type in which a core back is split into a plurality of core back portions along its circumferential direction, and in which the split core back portions and tooth portions radially projected from the respective split core back portions are integrated into T-shaped core back pieces. The other is, as disclosed in, for example, Japanese Patent No. 2547131 and JP-A-6-133501, a type in which the stator is split into a teeth portion and an annular core back portion.

By splitting the core into a plurality of parts in these manners, tracks necessary for the movement of a nozzle of a coil winding machine can be secured for winding a coil. This improves the alignment property of coils and enables a high coil space factor to be obtained. The splitting of the core further makes it possible to shorten coil ends, which are magnetically inoperative portions, and reduce the shaft length of a rotating electric machine, as well as decrease copper loss. This allows an achievement of the miniaturization of rotating electric machinery and the enhancement of its efficiency. As a result, such core-splitting methods are coming into widespread adoption in rotating electric machinery for automobiles, which are subjected to restrictions on installation space and weight.

Moreover, in order to miniaturize and cost-cut rotating electric machinery, there are efforts underway to minimize the number of connection points at coil terminals by continuously winding series coils of the same phase. Here, processing of a crossover wire between coils wound in series is required. However, if there is a sufficient space outside each bobbin, a known structure is used in which, as disclosed in, for example, JP-A-10-271718 and JP-A-11-18331, a guide is integrally provided on the outer periphery of each bobbin, and a crossover wire is routed between coils.

SUMMARY OF THE INVENTION

However, especially in rotating electric machinery for automobiles, there are tight restrictions imposed on size in the radial direction, and in addition, there is a trend of coils to use thicker wires, so that crossover wires cannot be routed between the rear surfaces of coil ends in many cases. As a result, for example, as set forth in "NIKKEI Automotive Technology Autumn, p. 186 (2004)", the crossover wire is disposed in a space above the coil end. Here, two adjacent coils in series are continuously wound, and a resin electric circuit board having a conductor embedded therein is installed above the coil end, with twelve remaining terminal lines connected to a circuit. However, because the crossover wire projects above the coil end, legs of connection components are lengthened to avoid interference between the crossover wire and connection components. Thus, disposing a crossover wire in the space above the coil end increases the length of a crossover wire that projects above the coil end. This causes a problem in that the size of the rotating electric machine in the axial direction cannot be reduced because of the need for an accommodation space for the crossover wire. Out of electric power steering motors, especially in a motor for a column type power steering system, installed to a steering column, it is desired to reduce its length in the axial direction in terms of its installation space, since it is placed in a vehicle interior.

It is an object of the present invention to provide a production method for a rotating electric machine and stator coils, and electric power steering motor, capable of reducing the axial length of the rotating electric machine.

(1) To achieve the above-described objects, the present invention, in one aspect, provides a rotating electric machine including a stator and a rotor opposed to the stator with a gap therebetween. The stator includes a stator core and multiphase stator coils incorporated into the stator core. The stator core is formed by connecting a plurality of split core pieces. Herein, each of the stator coils is wound around a coil bobbin installed on the outer periphery of a tooth portion of a respective-one of the core pieces, by a concentrated winding method; and around the tooth portions that are adjacent to each other, the respective stator coils that have the same phase and mutually different in the winding direction are continuously wound. Furthermore, a crossover wire for connecting the first stator coil wound around a first tooth portion and the second stator coil wound around a second tooth portion, is located lower in its bottom than the end portion of the coil bobbin in the axial direction of the rotating electric machine, and located further toward the radially central side of the rotating electric machine than the outermost periphery of the coil bobbin.

Such an arrangement allows the axial length of the rotating electric machine to be reduced.

(2) In the rotating electric machine according to the present invention, it is preferable that the crossover wire be located on the coil end of the second stator coil, and that the bottom of the crossover wire be located lower than the upper end face of the coil bobbin.

(3) In the rotating electric machine according to the present invention, it is preferable that the crossover wire be located on the coil end of the second stator coil in close contact therewith.

(4) In the rotating electric machine according to the present invention, it is preferable that the crossover wire be located on the end surface of the coil bobbin of the first stator coil in the axial direction of the rotating electric machine, and that the bottom of the crossover wire be located lower than the outermost layer of the first stator coil.

(5) In the rotating electric machine according to the present invention, it is preferable that the crossover wire be located in a gap between the outermost periphery of the outermost layer of the coil end of the second stator coil and a flange of the coil bobbin, and that the bottom of the crossover wire be located lower than the outermost layer of the second stator coil.

(6) Also, to attain the above-described object, the present invention, in another aspect, provides a production method for stator coils including: winding first and second stator coils having the same shape, by a concentrated winding method, around coil bobbins installed on the outer peripheries of respective tooth portions of a stator core; and around the tooth portions that are adjacent to each other, continuously winding the respective stator coils that have the same phase and mutually different in the winding direction. Herein, the first and second stator coils are continuously wound in a state where the axes of the first and second stator coils are displaced from each other in the axial direction of the stator. Furthermore, a crossover wire for connecting the first and second stator coils is moved onto the coil end of the second stator coil, and thereafter, relative positions of the two stator coils, as viewed from the coil end side on which the crossover wire lies, are conformed to each other.

Such a method allows the axial length of the rotating electric machine to be reduced.

(7) Furthermore, to achieve the above-described object, the present invention, in still another aspect, provides a production method for a stator coil including: winding first and second stator coils having the same shape, by a concentrated winding method, around coil bobbins installed on the outer peripheries of respective tooth portions of a stator core; and around the tooth portions that are adjacent to each other, continuously winding the respective stator coils that have the same phase and mutually different in the winding direction. Herein, the first and second stator coils are continuously wound in a state where the axes of the first and second stator coils are displaced from each other in the axial direction of the stator. Also, a crossover wire for connecting the first and second stator coils is moved onto the coil end of the second stator coil, and thereafter, relative positions of the two stator coils, as viewed from the coil end side on which the crossover wire lies, are conformed to each other by relatively inverting the positions of the first and second stator coils.

Such a method enables the axial length of the rotating electric machine to be reduced.

(8) Moreover, to attain the above-described object, the present invention, in a further aspect, provided an electric power steering motor driven by multiphase alternating current power for outputting steering torque, including: a stator, and a rotor opposed to the stator with a gap therebetween. The stator includes a stator core, and multiphase stator coils incorporated into the stator core. The stator core is formed by connecting a plurality of split core pieces. Herein, each of the stator coils is wound around a coil bobbin installed on the outer periphery of a tooth portion of a respective one of the core pieces, by a concentrated winding method; and around the tooth portions that are adjacent to each other, the respective stator coils that have the same phase and mutually different in the winding direction are continuously wound. Also, a crossover wire for connecting the first stator coil wound around a first tooth portion and the second stator coil wound around a second tooth portion, is located lower in its bottom than the end portion of the coil bobbin in the axial direction of the rotating electric machine, and located further toward the radially central side of the rotating electric machine than the outermost periphery of the coil bobbin.

Such a feature allows the axial length of the rotating electric machine to be reduced.

(9) Furthermore, to attain the above-described object, the present invention, in a yet further aspect, provides a rotating electric machine including: a stator, and a rotor opposed to the stator with a gap therebetween. The stator includes a stator core, and multiphase stator coils incorporated into the stator core. The stator core is formed by connecting a plurality of split core pieces. Herein, each of the stator coils is wound around a coil bobbin installed on the outer periphery of a tooth portion of a respective one of the core pieces, by a concentrated winding method; and around the tooth portions that are adjacent to each other, the respective stator coils that have the same phase and mutually different in the winding direction are continuously wound. Moreover, a crossover wire for connecting the first stator coil wound around the first tooth portion and the second stator coil wound around the second tooth portion, is located at a position further toward the center side in the axial direction of the coil bobbin than the end portion of the coil bobbin, inclusive of the end portion of the coil bobbin.

Such an arrangement allows the axial length of the rotating electric machine to be reduced.

(10) Moreover, to achieve the above-described object, the present invention, in a further aspect, provides an electric power steering motor driven by multiphase alternating current power for outputting steering torque, including: a stator, and a rotor opposed to the stator with a gap therebetween. The stator includes stator core, and multiphase stator coils incorporated into the stator core. The stator core is formed by connecting a plurality of split core pieces. Herein, each of the stator coils is wound around a coil bobbin installed on the outer periphery of a tooth portion of a respective one of the core pieces, by a concentrated winding method; and around the tooth portions that are adjacent to each other, the respective stator coils that have the same phase and mutually different in the winding direction are continuously wound. Also, a crossover wire for connecting the first stator coil wound around the first tooth portion and the second stator coil wound around the second tooth portion, is located at a position further toward the center side in the axial direction of the coil bobbin than the end portion of the coil bobbin, inclusive of the end portion of the coil bobbin.

Such a feature enables the axial length of the rotating electric machine to be reduced.

DESCRIPTION OF THE PREFERRED EMBODIMENTS

Hereinafter, the construction of a rotating electric machine according to an embodiment of the present invention and a production method therefor will be described with reference to FIGS. 1 to 15. Here, an electric power steering motor (hereinafter referred to as an "EPS motor") is taken as an example.

First, the construction of the rotating electric machine according to the embodiment of the present invention will be explained with reference to FIGS. 1 and 2.

Figure 1:
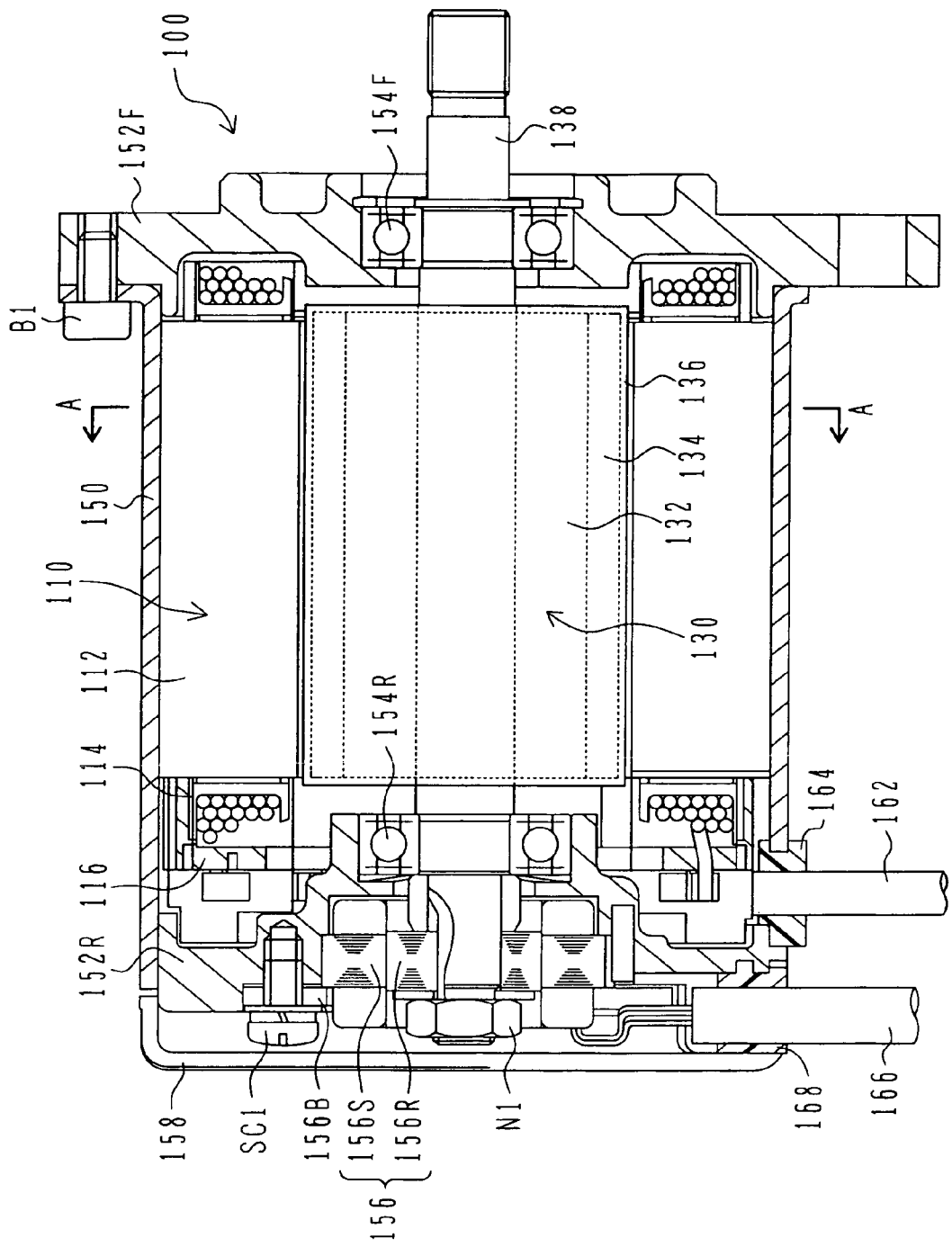
FIG. 1 is a longitudinal sectional view showing the construction of a rotating electric machine according to an embodiment of the present invention.
Figure 2:
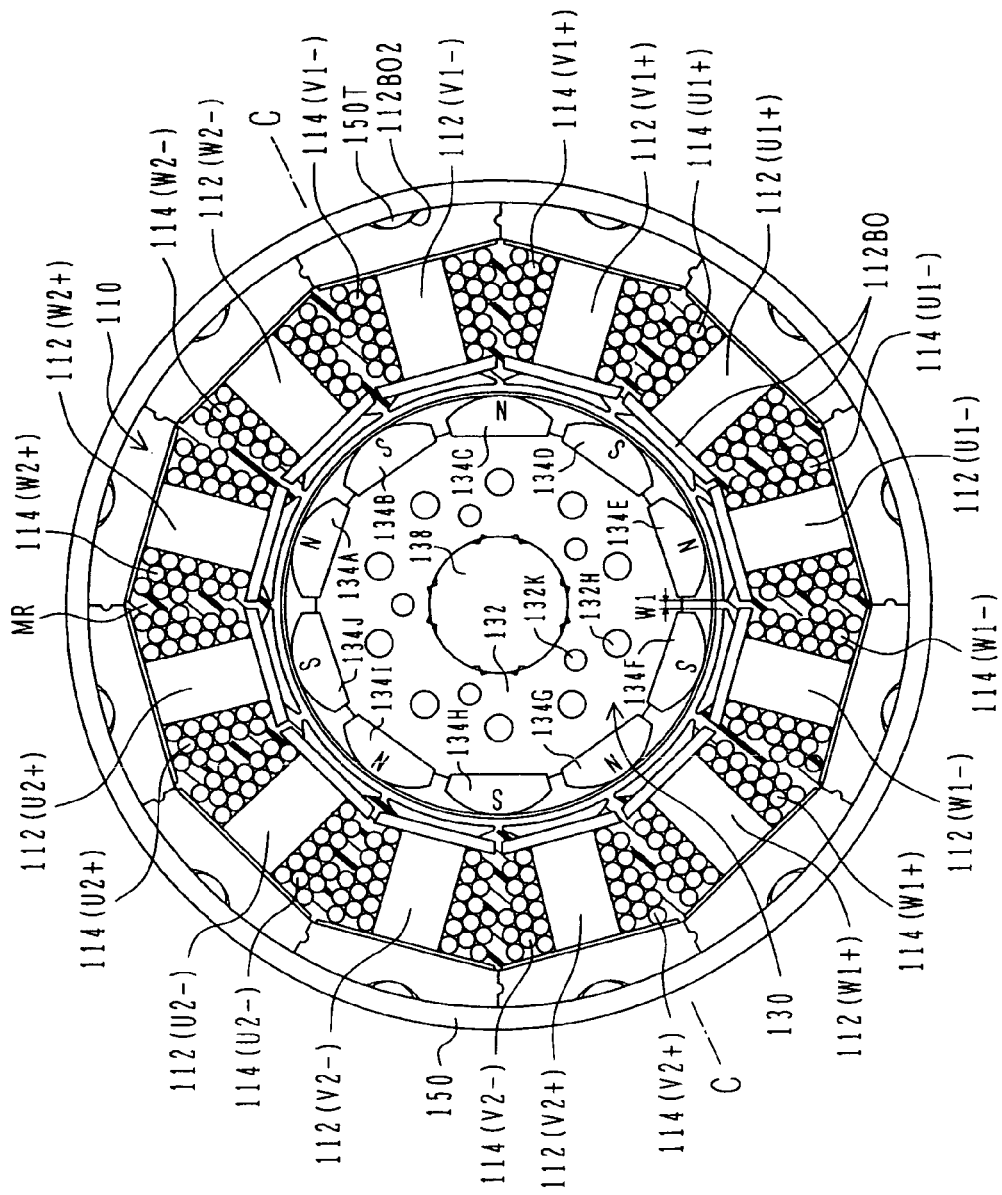
FIG. 2 is a cross-sectional view taken along a line A-A in FIG. 1.

FIG. 1 is a longitudinal sectional view showing the construction of the rotating electric machine according to the present embodiment. FIG. 2 is a cross-sectional view taken along a line A-A in FIG. 1.

As shown in FIG. 1, the rotating electric machine 100 is a surface permanent magnet type synchronous motor, including a stator 110 and rotor 130 rotatably supported inside the stator 110. The rotating electric machine 100 is driven by power supplied from an on-board power source equipped with a battery, for example, a 14 volt power source (12 V battery output voltage), a 24 volt power source or 42 volt power source (36 V battery output voltage), or 48 V power source.

The stator 110 includes a stator core 112 formed of a magnetic substance laminated with electrical steel sheets, and stator coils 114 each held in a slot of the stator core 112. As will be described later with reference to FIG. 2, the stator core 112 is composed of T-shaped cores each formed by integrating a split annular back core and a tooth. Each of the plurality of teeth is wound with a stator coil 114. The way the stator coil 114 is wound on the tooth is a concentrated winding method.

The length of the coil end of the stator coil 114 can be reduced by the concentrated winding of the stator coil 114. This contributes to the reduction in the length of the rotating electric machine 100 in its rotational axis direction. Since the length of coil end of the stator coil 114 can be reduced, the resistance of the stator coil 114 can be decreased and a rise in motor temperature can also be suppressed. Reduction in coil resistance allows the copper loss of the motor to be decreased. As a result, the percentage of energy consumed by copper loss relative to the input energy into the motor can be reduced, thus allowing an improvement in the efficiency of the output torque with respect to the input energy.

As described above, the rotating electric machine is driven by the power source mounted on a vehicle. In many cases, the output voltage of this power source is low. A series circuit is equivalently formed by a switching device with an inverter formed across the power source terminals, the above-described motor, and other current supply circuit connecting means. In the above-described circuit, a total of the terminal voltages of circuit constituent devices becomes the terminal voltage of the above-described power source. As a consequence, the terminal voltage of the motor for supplying current to the motor becomes low. In order to ensure current flowing into the motor under this situation, it is essential to keep the copper loss of the motor low. From this reason, a low voltage system of 50 volts or less is frequently used as a power source mounted on a vehicle. It is, therefore, desirable to apply the concentrated winding method to the stator coil 114. This is significantly important especially when a power source of 12 volt power source is employed.

The rotating electric machine is placed close to a steering column, or close to a rack-and-pinion mechanism. In either case, its miniaturization is required. In the miniaturized structure, the stator winding must be fixed in position. It is also important to facilitate winding work. The concentrated winding provides easier winding work and fixing work of windings than the distributed winding.

The ends of the stator coil 114 are molded. It is desirable for the rotating electric machine to reduce torque fluctuation such as cogging torque to a very low level. After the stator portion has been assembled, machining may be performed again inside the stator. Such machining operation involves cutting chips. Because the cutting chips must be prevented from entering gaps in slots, the insides of the slots and the coil ends are molded. The coil ends refer to "areas projecting in the axial direction from both axial ends of the stator core 112", out of a plurality of areas of the stator coil 114. In this embodiment, there are provided gaps between the mold resin covering the coil ends of the stator coil 114 and the frame 150. Alternatively, however, the mold resin may be filled up to the position where the mold resin comes in contact with the frame, a front flange 152F and rear flange 152R. Thereby, the heat generated from the stator coil 114 can be directly transferred from the coil ends through the mold resin to the frame 150, front flange 152F, and rear flange 152R, and released to the outside. The heat transfer by this method can reduce effectively temperature rise in the stator coil 114 compared with the heat transfer via air.

The stator coils 114 are composed of three phases: U, V, and W phases, and each of the stator coils 114 is constituted of a plurality of unit coils. The plurality of unit coils is connected by a connection ring 116 provided on the left side in FIG. 1, for each of the three phases.

The rotating electric machine is required to generate a large torque. For example, when the vehicle is stopped or is slowly running close to the stopped state, if a steering wheel is quickly turned, the rotating electric machine is required to provide a large torque due to a frictional resistance between steered wheels and the ground. At this time, a large current is supplied to the stator coils. This current can be 50 A or more, although it depends on a condition. Furthermore, it can possibly be 70 or 150 A. In order to ensure safe supply of such a large current and reduce the generation of heat due to the above-described current, it is very important to use the connection ring 116. Supplying the current to the stator coils through the connection ring 116 makes it possible to reduce the connection resistance and prevent a voltage drop due to copper loss. This facilitates the supply of a large current, and produces the effect of reducing the time constant for current startup resulted by an operation of inverter element.

Each stator core 112 and a respective corresponding one of the stator coils 114 are integrally molded by a resin (electrically insulating type), and constitute a stator subassembly. These integrally-molded stator subassemblies are press fitted with the cylindrical frame 150 formed of a metal such as aluminum, and molded in a fixed state. Alternatively, however, the integrally-molded stator subassemblies may be molded in a state where the stator coils 114 has been incorporated in the respective corresponding stator core 112, and may be press fitted with the frame 150 thereafter.

The EPS motors mounted on vehicles are subject to various forms of vibration, as well as impacts from wheels. Furthermore, the EPS motors are employed under wide temperature variations. They may be exposed to temperatures of −40° C., or 100° C. or more due to a temperature rise. Moreover, the EPS motors must be protected from the entering of water. In order to fix the stator to the frame 150 under such conditions, it is desirable to press fit the stator subassemblies into a cylindrical metal without any hole other than screw holes, on the outer periphery of at least the stator core of the cylindrical frame. After the press fitting, the subassemblies may also be screwed in from the outer periphery. In addition to the press fitting, locking means is preferably provided.

The rotor 130 includes a rotor core 132 formed of a magnetic substance laminated with an electric steel sheets; magnets 134 as a plurality of permanent magnets bonded on the surface of the rotor core 132 by adhesive; and a magnet cover 136 composed of non-magnetic substance provided on the outer periphery of the magnets 134. Each of the magnets 134 is a rare-earth magnet and is composed of, e.g., neodymium. The rotor core 132 is fixed on a shaft 138. The plurality of magnets 134 are bonded on the surface of the rotor core 132 by adhesive. The outer periphery of the rotor 130 is covered with the magnet cover 136, whereby the magnet 134 is prevented from being thrown out. The magnet cover 136 is made of stainless steel (commonly known as SUS). It may be wound with tape. Use of the stainless steel provides easier production. As described above, the ESP motor is suited to hold the permanent magnet that is subjected to severe vibrations and thermal variations, and is easy to break down. Even if the permanent magnet breaks down, it is prevented from being thrown out, as described above.

A front flange 152F is arranged on one end of the cylindrical frame 150. The frame 150 and a front flange 152F are fixed together by a bolt B1. A rear flange 152R is press-fit into the other end of the frame 150. A bearing 154F and a bearing 154R are mounted on the front flange 152F and rear flange 152R, respectively. A shaft 138 and a stator 110 fixed thereto are rotatably supported by these bearings 154F and 154R.

The front flange 152F has an annular projection (or extension). The projection of the front flange 152F is projected in the axial direction, that is, it extends from the side surface of the front flange 152F on the coil end side toward the coil end side. When the front flange 152F is fixed to the frame 150, the tip of the projection of the front flange 152F is inserted into the gap formed between the molding material on the coil end on the front flange 152F side and the frame 150. In order to improve heat radiation from the coil end, it is desirable that the projection of the front flange 152F be in close contact with the molding material of the coil end on the side of the front flange 152F.

The rear flange 152R has a cylindrical recess. Each of the recesses of the rear flange 152R is concentric with the center axis of the shaft 138, and is located axially inwardly (on the side of the stator core 112) from the axial end of the frame 150. The tip of the recess of the rear flange 152R extends toward the bore side of the coil end on the side of the rear flange 152R, and is located radially opposite to the coil end on the side of the rear flange 152R. A bearing 154R is held by the tip of the recess of the rear flange 152R. The axial end of the shaft 138 on the side of the rear flange 152R extends further outwardly (opposite to the rotor core 132 side) from the bearing 154R to reach the position close to the opening of the recess of the rear flange 152R, or the position projecting slightly outwardly from the opening in the axial direction.

A resolver 156 is arranged in the gap formed between the inner peripheral surface of the recess of the rear flange 152R and the outer peripheral surface of the shaft 138. The resolver 156 includes a resolver stator 156S and a resolver 156R, and is located outwardly (opposite to the rotor core 132 side) from the bearing 154R in the axial direction. The resolver rotor 156R is fixed to one end (left end in FIG. 1) of the shaft 138 by a nut N1. By fixing a resolver holding plate 156B to the rear flange 152R by screws SC1, the resolver stator 156S is fixed to the inner periphery of the recess of the rear flange 152R, and is opposed to the resolver rotor 156R with a gap therebetween. The resolver 156 is composed of the resolver stator 156S and resolver rotor 156R. The rotation of the resolver rotor 156R is detected by the resolver stator 156S, whereby the positions of a plurality of magnets 134 can be detected. More specifically, the resolver comprises a resolver rotor 156R having a concavo-convex pattern on its outer peripheral surface (e.g., elliptical or petal-shaped), and a resolver stator 156S with two output coils (electrically out of phase by 90 degrees with each other) and an exciting coil wound around its core. When an AC voltage is applied to the exciting coil, there occurs an AC voltage to the two output coils, in response to the variation in the length of the gap between the resolver rotor 156R and resolver stator 156S, the AC voltage having a phase difference in proportion to an rotational angle. Thus, the resolver is intended to detect two output voltages mutually having a phase difference. The magnetic pole position of the rotor 130 is detected by determining the phase angle from the phase angle of the two output voltage having been detected. On the outer periphery of the rear flange 152R, there is provided a rear holder 158 so as to cover the resolver 156.

Power is supplied from an external battery to each of the U, V and W phases through a power cable 162. The power cable 162 is mounted on the frame 150 by a grommet 164. The magnetic pole position signal detected from the revolver stator 156S is taken out by a signal cable 166. The signal cable 166 is mounted on a rear holder 158 by a grommet 168. The connection ring 116 and part of the power cable 162 are molded together with the coil end, using the molding material.

Next, the construction of the stator 110 and rotor 130 will be described more specifically with reference to FIG. 2. FIG. 2 is a cross-sectional view taken along a line A-A in FIG. 1. In FIG. 2, the same reference characters as those in FIG. 1 designate the same parts.

First, the construction of the stator 110 will be explained. In the stator 110, the stator core 112 comprises twelve T-shaped teeth-integrated split back cores: 112 (U1+), 112 (U1−), 112 (U2+), 112 (U2−), 112 (V1+), 112 (V1−), 112 (V2+), 112 (V2−), 112 (W1+), 112 (W1−), 112 (W2+), and 112 (W2−). That is, the annular back core is split into twelve parts along its circumferential direction, and twelve teeth are integrated with the respective split annular back cores into T-shaped teeth-integrated back core pieces. These T-shaped teeth-integrated split back cores 112 (U1+), . . . 112 (W2−) are made of a lamination of a magnetic sheet metal such as an electric steel plate stamped out by press molding.

The teeth of the teeth-integrated split back cores 112 are wound with stator coils 114 (U1+), 114 (U1−), 114 (U2+), 114 (U2−), 114 (V1+), 114 (V1−), 114 (V2+), 114 (V2−), 114 (W1+), 114 (W1−), 114 (W2+), and 114 (W2−), respectively, in the concentrated winding method.

Here, the stator coil 114 (U1+) and the stator coil 114 (U1−) are wound in such a way that current flows in mutually opposite directions. The stator coil 114 (U2+) and the stator coil 114 (U2−) are also wound in such a way that current flows in mutually opposite directions. The stator coil 114 (U1+) and the stator coil 114 (U2+) are wound in such a way that current flows in the same direction. The stator coil 114 (U1−) and the stator coil 114 (U2−) are also wound in such a way that current flows in the same direction. The relationship of the directions of current flow for the stator coils 114 (V1+), 114 (V1−), 114 (V2+), and 114 (V2−), and the relationship of the directions of current flow for the stator coils 114 (W1+), 114 (W1−), 114 (W2+), and 114 (W2−) are also the same as those in the above-described case of U phases.

Next, concave portions formed in the circumferential end faces of the T-shape teeth-integrated split back cores 112 (U1+), . . . 112 (W2−) and convex portions formed on the inner periphery of the frame 150 having a shape for fitting, are fit together, and thereby the assembling work of the stator 110 is completed.

Then, a plurality of places on the outer periphery of the back core 112 (U1+), . . . 112 (W2−) is press fitted with the inner peripheral side of the frame 150. Under this condition, the stator core 112 and stator coils 114 are integrally molded by a thermosetting resin MR to form stator subassemblies. In the present embodiment, as described above, the stator core 112 and stator coils 114 are integrally molded in a state where the stator core 112 with the stator coils 114 incorporated therein has been press fitted with the frame 150. Alternatively, however, the stator core 112 and stator coils 114 may be integrally molded in a state where the stator coils 114 have been incorporated into the stator core 112, and thereafter the stator core 112 may be press fitted with the frame 150.

In performing molding using the molding material, a jig (not shown) is mounted on a structure composed of the stator core 112 and frame 150 so as to enclose the stator core 112 and the coil ends of the stator coils 114 projecting in the axial direction from the axial end of the stator core 112 by the jig (not shown) and frame 150. Then, the molding material in a liquid state is poured into the space enclosed by the jig (not shown) and the frame 150, thereby filling the molding material into the gaps between the core ends and stator core 112, the gaps in the stator coils 114, the gaps between stator core 112 and stator coils 114, and the gap between the stator core 112 and frame 150. Then, the molding material is solidified, and after it has solidified, the jig (not shown) is removed.

The inner peripheral surfaces of the molded stator subassemblies, namely, the tips of the tooth portions of the teeth-integrated split back cores as the surfaces radially opposite to the rotor 130 are subjected to machining. This reduces the variation in the gap between the stator 110 and rotor 130, and further improves the roundness of the bore of the stator 110. Also, the integral molding allows an improved dissipation of heat generated by the energization of the stator coils 114, as compared to the case where integral molding is not adopted. Furthermore, the molding process enables protection of the stator coils and teeth against vibrations. Moreover, machining the bore of the stator after molding enables an improvement in the roundness of the bore of the stator and a reduction in cogging torque. The reduction in the cogging torque, in turn, allows an enhancement of the steering comfort.

Convex portions 150T are arranged inside the frame 150. On the outer periphery of the back core 112B, concave portions 112BO2 are arranged so as to correspond to the concave portions 150T. The convex portions 150T and concave portions 112BO2 constitute engagement portions IP having mutually different curvatures for engagement with each other. These engagement portions IP are continuously formed in the axial direction, and arranged in twelve at a predetermined spacing along the circumferential direction. The engagement portion also serves as a press-fit portion. Specifically, when the stator core 112 is fixed to the frame 150, the concave portions 112BO2 of the back core 112B are press fitted with the convex portions 150T of the frame 150 so that the tips of the convex portions 150T of the frame 150 and the bottoms of the concave portions 112BO2 abut against each other. In this manner, in the present embodiment, the stator core 112 is fixed to the frame 150 by partial press-fitting. This press-fitting process forms a minute gap between the frame 150 and stator core 112. In the present embodiment, when the stator core 112 and stator coils 114 are molded by the molding material MR, the gap between the frame 150 and stator core 112 is simultaneously filled with the molding material. Here, the engagement portion serves as a locking portion to prevent the stator core 112 from turning in the circumferential direction with respect to the frame 150.

As described above, in the present embodiment, since the stator core 112 is partially press fitted with the frame 150, it is possible to improve the sliding property between the frame 150 and stator core 112 and reduce rigidity. In the present embodiment, this enhances the effect of damping noises between the frame 150 and stator core 112. Furthermore, in the present embodiment, since the gap between the frame 150 and stator core 112 is filled with the molding material, the noise damping effect can be further enhanced.

Alternatively, the arrangement may be such that the convex portions 150T and concave portions 112BO2 are formed in a non-contact structure and are used only for locking purposes, and that the outer peripheral surface of the back core 112B is press fitted into the inner peripheral surface of the frame 150 other than the convex portions 150T and concave portions 112BO2.

The stator coils 114 (U1+) and 114 (U1−), and stator coils 114 (U2+) and 114 (U2−) are positioned symmetrically relative to the center of the stator 110. More specifically, the stator coils 114 (U1+) and 114 (U1−) are located adjacent to each other, and the stator coils 114 (U2+) and 114 (U2−) are also located adjacent to each other. Furthermore, the stator coils 114 (U1+) and 114 (U1−), and stator coils 114 (U2+) and 114 (U2−) are positioned in symmetrically with respect to a line, relative to the center of the stator 110. That is, the stator coils 114 (U1+) and 114 (U1−), and the stator coils 114 (U2+) and (U2−) are placed in line symmetry, with respect to the broken line C-C passing through the center of the shaft 138.

Similarly, the stator coils 114 (V1+) and (V1−); and stator coils 114 (V2+) and 114 (V2−) are positioned symmetrically with respect to a line. The stator coils 114 (W1+) and (W1−);

and stator coils 114 (W2+) and 114 (W2−) are also positioned symmetrically with respect to a line.

Adjacent stator coils 114 of the same phase are continuously wound using one wire, namely, the stator coils 114 (U1+) and 114 (U1−) are formed of one wire, which constitutes the two winding coils. They are wound on the respective corresponding teeth. Likewise, the stator coil 114 (U2+) and stator coil 114 (U2−) are continuously wound by one wire. Similarly, the stator coils 114 (V1+) and 114 (V1−); stator coils 114 (V2+) and 114 (V2−); the stator coils 114 (W1+) and 114 (W1−); and stator coils 114 (W2+) 114 (W2−) are continuously wound using one wire.

Such line-symmetric positioning of coils and winding of two adjacent coils of the same phase by one wire, can contribute to the simplification of construction of the connection ring, when coils of the same or difference phases are connected by the connection ring.

Next, the construction of the rotor 130 will be described. The rotor 130 includes a rotor core 132 formed of a magnetic substance; ten magnets 134 (134A, 134B, 134C, 134D, 134E, 134F, 134G, 134H, 134I and 134J) fixed to on the surface of the rotor core 132 by an adhesive; and a magnet cover 136 arranged on the outer periphery of the magnets 134. The rotor core 132 is fixed to the shaft 138.

When the surface side (side opposite to the teeth 112T of the stator) is an N-pole, the magnets 134 are magnetized in the radial direction so that the back side thereof (side bonded to the rotor core 132) becomes an S-pole. Conversely, in some cases, when the surface (side opposite to the teeth 112T of the stator) is an S-pole, the magnets 134 are magnetized in the radial direction so that the back side thereof (side bonded to the rotor core 132) becomes an N-pole. The adjacent magnets 134 are magnetized in such a way that the magnetized poles alternate with each other in the circumferential direction. For example, if the surface side of the magnet 134A is magnetized into the N-pole, the surface sides of the adjacent magnets 134B and 134J are magnetized into the S-pole. That is, when the surface sides of the magnets 134A, 134C, 134E, 134G and 134I are magnetized into the N-pole, the magnets 134B, 134D, 134F, 134H and 134J are magnetized into the S-pole.

The magnets 134 have a semicylindrical cross section. Here, the semicylindrical shape refers to a "structure wherein, in its circumferential direction, its radial thickness of the right and left sides is smaller than that at the center. Such a semicylindrical structure allows the magnetic flux to be sinusoidally distributed. Thereby, induced voltage waveform resulting from the rotation of the EPS motor can be made a sinusoidal wave, and pulsation can be reduced. Reduction in the pulsation allows improvement in steering comfort. When a magnet is formed by magnetizing an annular magnetic substance, the magnetic flux may be distributed in a form similar to a sinusoidal wave by controlling a magnetizing force.

The rotor core 132 has ten large-diameter through holes 132H formed on a concentric circle, and five small-diameter recesses 132K formed on the inner peripheral side of the concentric circle of the through holes 132H. The rotor core 132 is composed of a lamination of a sheet metal such as SUS having been stamped out by press molding. The recesses 132K are formed at the time of press molding. When a plurality of metal sheets is laminated, the recesses 132K are fitted with each other for positioning. The through-holes 132H are for reducing inertia, and they can improve the balance of the rotor. The outer periphery of the magnets 134 are covered by the magnet covers 136 to prevent the magnets 134 from being thrown out. The back core 112B and rotor core 132 can be formed simultaneously from the same metal sheet by stamping out by a press.

As described above, the rotor 130 according to the present embodiment has ten magnets 134 and ten poles. As described above, twelve teeth 112T are provided. The number of slots formed between adjacent teeth is 12. That is, the EPS motor according to the present embodiment is a 10-pole and 12-slot surface magnetic type synchronous motor.

Next, a production method for the rotating electric machine according to the present embodiment will be described with reference to FIGS. 3 to 17.

Figure 4:
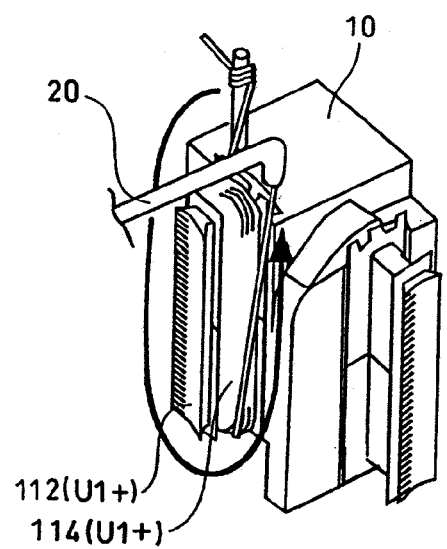
FIG. 4 is a perspective view of the rotating electric machine during production, according to the embodiment of the present invention.
Figure 5:
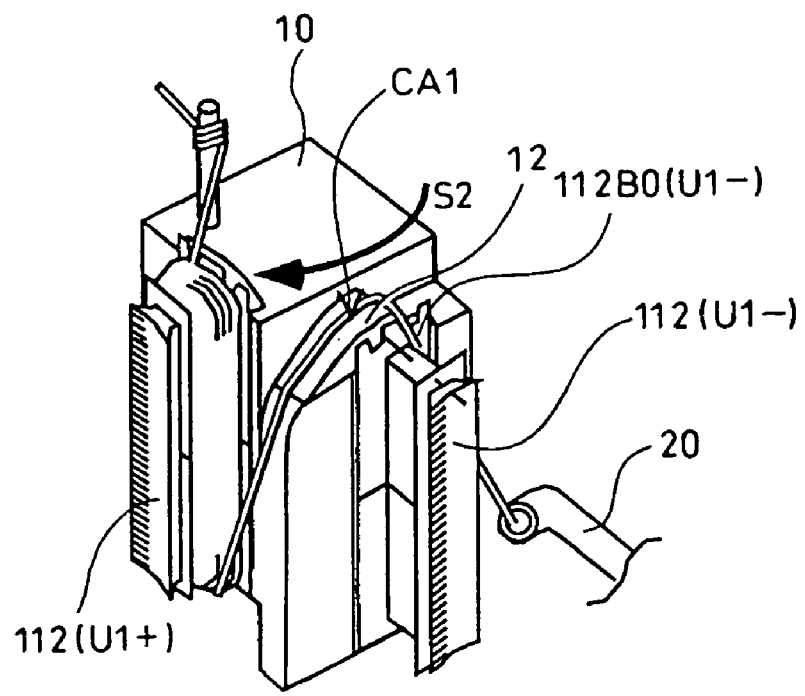
FIG. 5 is a perspective view of the rotating electric machine during production, according to the embodiment of the present invention.
Figure 6:
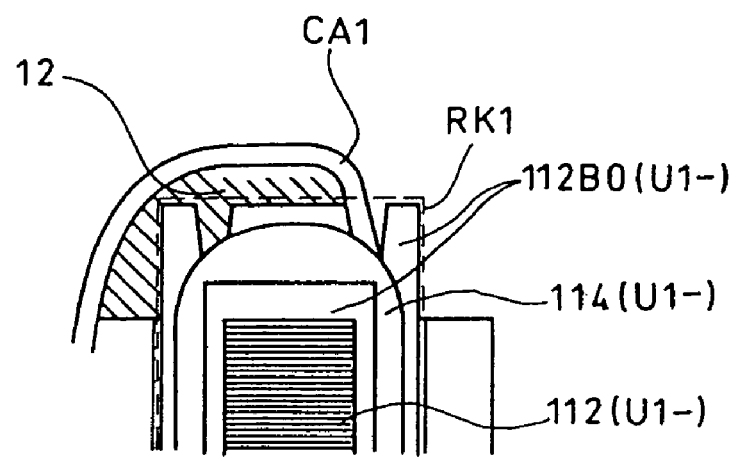
FIG. 6 is a front view of the rotating electric machine during production, according to the embodiment of the present invention.

FIGS. 3, 4, 5, 7, and 8 are each a perspective view of a rotating electric machine during production, according to an embodiment of the present invention. FIGS. 6 and 10 are each a front view of the rotating electric machine during production, according to the embodiment of the present invention. FIGS. 9 and 11 are each a plan view of the rotating electric machine during production, according to the embodiment of the present invention. FIGS. 12 to 15 are each a sectional view of the major portion of the rotating electric machine during production, according to the embodiment of the present invention. FIG. 16 is a front view of the major portion of the rotating electric machine during production in the example shown in FIG. 14, according to the embodiment of the present invention. FIG. 17 is a plan view of the rotating electric machine during production in the example shown in FIG. 15, according to the embodiment of the present invention. In FIGS. 3 to 17, the same reference characters as those in FIGS. 1 and 2 designate the same parts.

Hereinafter, description is made of the case where, out of the plurality of stator coils 114 shown in FIG. 2, the coils 114 (U+), 114 (U−) having the same phase are continuously wound on the teeth portions of the T-shaped teeth-integrated split back cores 112 (U+) and 112 (U−) by the concentrated winding method. Continuous winding of other coils having the same phase can also be performed in the same manner.

Figure 3:
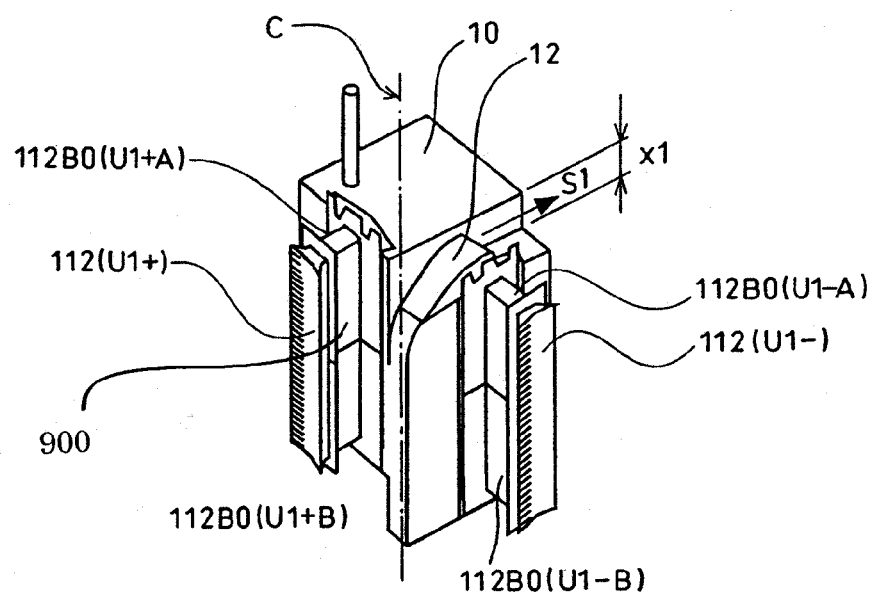
FIG. 3 is a perspective view of the rotating electric machine during production, according to the embodiment of the present invention.

As shown in FIG. 3, the bobbin 112BO is formed of an insulator such as plastic. The bobbin used for the teeth-integrated split back core 112 (U1+) is composed of bobbins 112BO (U1+A) and 112BO (U1+B), which have been split into two pieces. They are each formed by plastic molding, and have the same size and shape. The bobbins 112BO (U1+A) and 112BO (U1+B) each have a frame shape split in its center. For the bobbin 112BO (U1+A), its opening is inserted from above, as shown in FIG. 3, to the tooth portion, e.g., 900, of the teeth-integrated split back core 112 (U1+), while, for the bobbin 112BO (U1+B), its opening is inserted from below, as shown in FIG. 3, to the tooth portion of the teeth-integrated split back core 112 (U1+). Bobbin used for the teeth-integrated split back core 112 (U1−) is also composed of bobbins 112BO (U1−A) and 112BO (U1−B), which have been split into two pieces.

The teeth-integrated split back core 112 (U1+) equipped with the bobbins 112BO (U1+A) and 112BO (U1+B), and the teeth-integrated split back core 112 (U1−) equipped with the bobbins 112BO (U1−A) and 112BO (U1−B) are each fixed to a winding jig 10, with the inner peripheral side of their respective back cores faced toward the outside as shown in FIG. 3. The two back cores 112 (U1+) and 112 (U1−) are held on the wiring jig 10 at a predetermined angle (90 degrees in the case of FIG. 3) to ensure a moving space for the nozzle (described later in FIG. 4) necessary for winding.

Here, the wiring jig 10 is rotatable about an axis C shown in FIG. 3. The back core 112 (U1−), which is wounded with wire at the second time, is fixed to the wiring jig 10 at a position distant by a distance X1 from the position of the back core 112 (U1+), which is wound with wire at the first-time, as viewed from the coil end side on which the crossover wire lies. After the mounting of the second back core 112 (U1−) onto the wiring jig 10, a guide 12 is arranged on the rear surface of bobbin 112BO (U1−) of the second back core. The guide 12 is mounted onto the wiring jig 10 by bolts or the like, and after the second back core 112 (U1−) has been wound with wire, it can be taken out in the direction of an arrow S1 in FIG. 3.

Now, the winding process of the first stator coil 114 (U1+) will be described with reference to FIG. 4. The rotational track surface of the nozzle 20 of an automatic coil wiring machine is positioned perpendicular to the radial direction of the first back core 112 (U1+), and the nozzle 20 is moved around the first back core 112 (U1+) to thereby wind the first stator coil 114 (U1+).

Next, the winding process of the second stator coil 114 (U1−) will be described with reference to FIGS. 5 to 7. Following the winding of the first stator coil 114 (U1+), the second stator coil 114 (U1−) is wound in succession. With respect to the state shown in FIG. 4, when the second stator coil 114 (U1−) is wounded, the wiring jig 10 is rotated. Herein, as described above, since the two back cores 112 (U1+) and 112 (U1−) are arranged at the predetermined angle (90 degrees in the case of FIG. 3) with respect to each other, the angle to be rotated is 90 degrees. The state shown in FIG. 5 is such that the wiring jig 10 has been rotated 90 degrees in the direction of an arrow S2, with respect to the state shown in FIG. 4. However, for convenience of explanation, FIG. 5 shows a state as viewed from the position of the wiring jig 10 when its angle shown in FIG. 4 has been rotated 90 degrees in the direction opposite to the direction of the arrow S2.

When the wiring jig 10 is rotated 90 degrees in the direction of the arrow S2, the radial direction of the second back core 112 (U−) and the rotational track surface of the nozzle 20 orthogonally intersects each other, as shown in FIG. 5. An electric wire CA1 in a transition portion is routed on the guide 12, and the winding start portion of the electric wire of the second stator coil 114 (U−) is dropped through a groove in the rear surface of the bobbin 112BO (U1−) of the second back core 112 (U−).

As shown in FIG. 6, the surface on which the electric wire CA1 in the transition portion from the first stator coil 114 (U1+) to the second stator coil (U−) is mounted on the guide 12, is the outer peripheral side of the outline of the second stator coil 114 (U−) inclusive of a split back core and bobbin. Here, the outline of the second stator coil 114 (U−) inclusive of the split back core and bobbin refers to an outer radial line indicated by a broken line RK1 in FIG. 6. In this instance, because the size of the bobbin 112BO (U1−) on the back core side (back side in FIG. 6) is the largest, the outer diameter of the bobbin 112BO (U1−) provides the outline of the second stator coil 114 (U−) inclusive of the split back core and bobbin. The surface on which the electric wire CA1 in the transition portion is mounted on the guide 12 has a larger size than the outer radial size of the bobbin 112BO (U1−).

Figure 7:
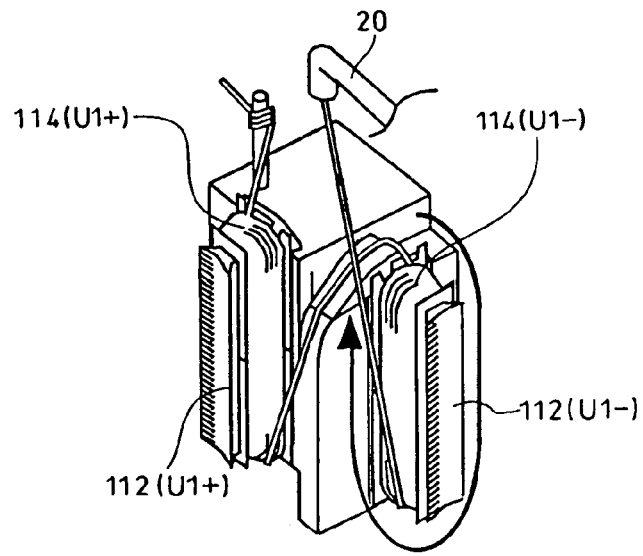
FIG. 7 is a perspective view of the rotating electric machine during production, according to the embodiment of the present invention.

Next, as shown in FIG. 7, the second stator coil 114 (U−) is wound around the second back core (U−) in the direction opposite to the winding direction of the first stator coil 114 (U+).

Figure 8:
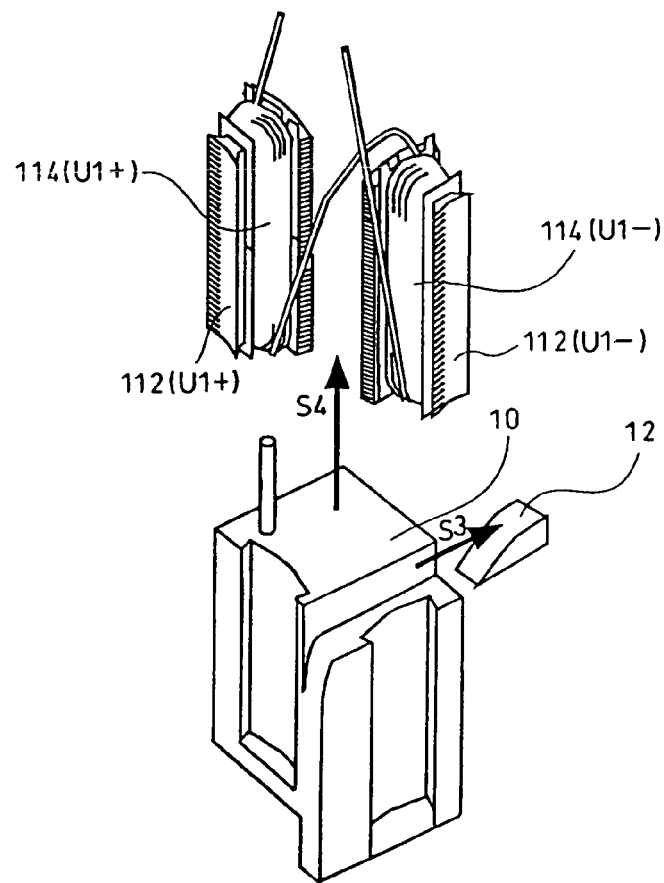
FIG. 8 is a perspective view of the rotating electric machine during production, according to the embodiment of the present invention.
Figure 9:
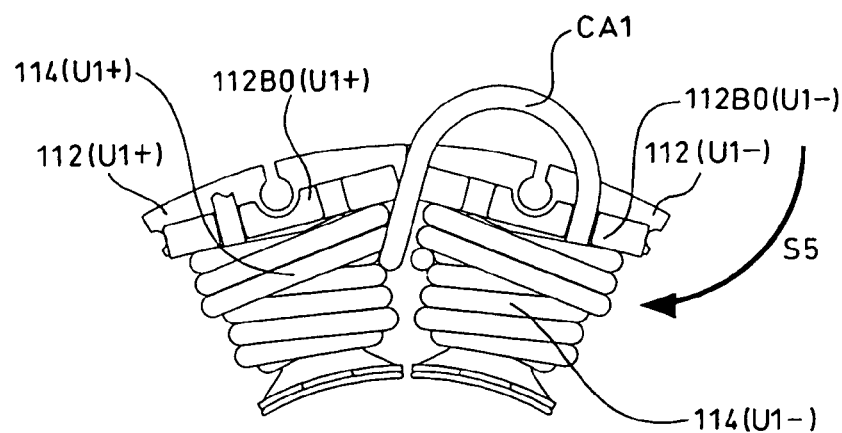
FIG. 9 is a plan view of the rotating electric machine during production, according to the embodiment of the present invention.

When the winding of the first stator coil 114 (U+) and second back core (U−) has been completed, the guide 12 is retracted in the direction of an arrow S3 as shown in FIG. 8. Thereafter, the back cores 112 (U+) and 112 (U−) that are wound with the coils 114 (U1+) and 114 (U−), respectively, are withdrawn in the direction of an arrow S4 shown in FIG. 8, and taken out from above the wiring jig 10.

Then, as shown in FIG. 9, the back core 112 (U−) is rotated in the direction of an arrow S5 with respect to the back core 112 (U+), and the split surfaces of the back cores 112 (U+) and 112 (U1−) of the coils 114 (U1+) and 114 (U1−) that have been taken out, are joined. Here, since the electric wire CA1 in the transition portion has been formed on the outer peripheral side of the coil 114 (U1−) inclusive of the split back core and bobbin, by the guide 12, the coil 114 (U1+) and the electric wire CA1 in the transition portion does not interfere with each other.

Next, as shown in FIG. 9, since the electric wire CA1 in the transition portion has been wound into the second coil 114 (U1−) from the rear surface of the bobbin 112BO (U1−), the position of the electric wire CA1 in the transition portion is moved from the rear surface of the bobbin 112BO (U1−) to the bore side, after both coils have been rotated.

Figures 10A, 10B:
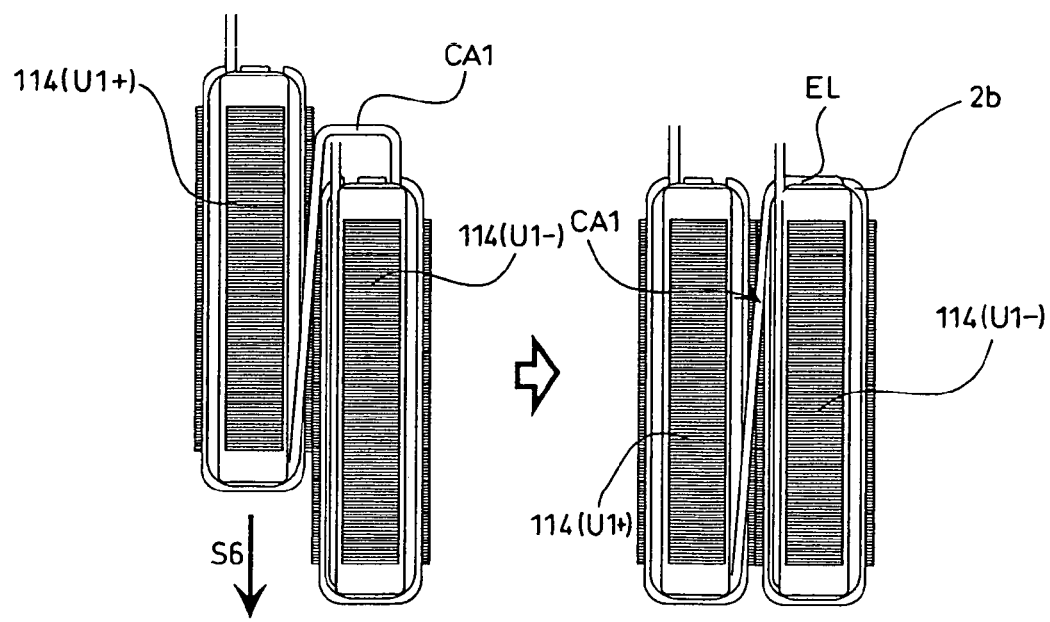
FIGS. 10A and 10B are each a front view of the rotating electric machine during production, according the embodiment of the present invention.
Figure 11:
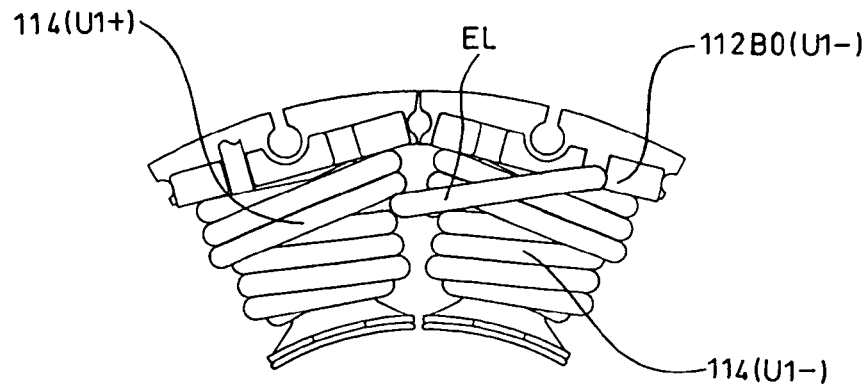
FIG. 11 is a plan view of the rotating electric machine during production, according to the embodiment of the present invention.

Then, as shown in FIG. 10A, the first stator coil 114 (U1+) inclusive of the split back core and bobbin is moved to the axial direction of the rotating electric machine (i.e., the direction of an arrow S6), whereby, as shown in FIG. 10B, the axial positions of the first and second stator coils 114 (U1+) and 114 (U1−) are conformed to each other. By this operation, as shown in FIG. 10B, one part of the electric wire in the transition portion, located above the coil end of the second stator coil 114 (U1−) is accommodated as one part of the last turn of the first stator coil 114 (U1+), so that a crossover wire EL is arranged at a position as shown in FIG. 11, thereby allowing the length of the crossover wire to be reduced as compared with that of conventional one. Adjustment of a difference X1 in the installation position of the wiring jig 10 on the back core allows the length of the crossover wire EL to be set to a desired size. The production method for the rotating electric machine described with reference to FIGS. 3 to 10 is effective when the line diameter of a conductor used for coils is smaller (e.g., 1.6 mm or less) to allow easy bending work. In the case where a 14-turn coil is wound as one stator coil 114, the installation position difference X1 is 8 mm for example. Of cause, since the difference X1 varies depending upon the size, shape, or the like of a tooth, an optimum value for minimizing the length of the crossover wire EL is selected.

Here, with reference to FIGS. 12 to 15, descriptions will be made of the positional relationships between the stator coil and the stator core that have been produced by the production method for the rotating electric machine according to the present embodiment.

Figure 12:
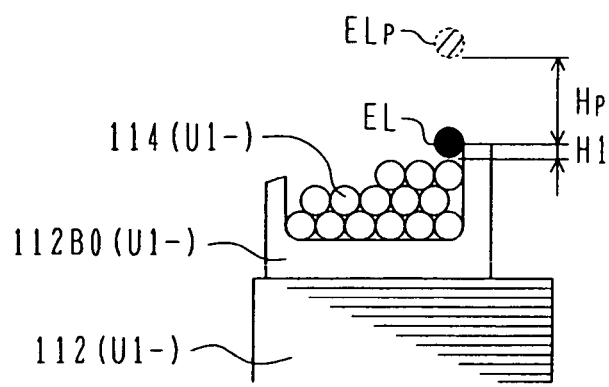
FIG. 12 is a sectional view of the major portion of the rotating electric machine during production, according to the embodiment of the present invention.

In an example shown in FIG. 12, the crossover wire EL for connecting the first and second stator coils 114 (U1+) and 114 (U1−) is located on the coil end of the second stator-coils 114 (U1−), and the bottom of the crossover wire EL is located lower than the upper end face of the coil bobbin by a height H1. Conventionally, as in the crossover wire ELp indicated by a broken line in FIG. 12, the bottom of the crossover wire EL has been disposed above the upper end face of the coil bobbin, that is, at a position higher than the upper end of the coil bobbin by a height Hp, thereby resulting in a longer coil end. In contrast, in the present embodiment, the position of the crossover wire can be made low, thereby leading to a shorter coil end.

Figure 13:
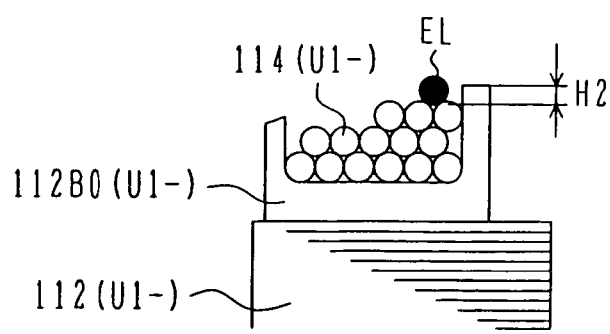
FIG. 13 is a sectional view of the major portion of the rotating electric machine during production, according to the embodiment of the present invention.

Also, in an example shown in FIG. 13, the crossover wire EL for connecting the first and second stator coils 114 (U1+) and 114 (U1−) is in close contact with the coil end of the second stator coils 114 (U1−), and the bottom of the crossover wire EL is located lower than the upper end face of the coil bobbin by a height H2.

Figure 14:
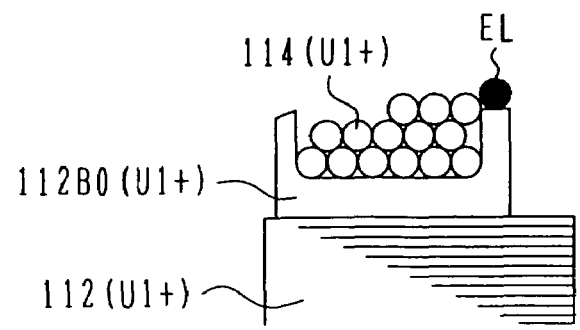
FIG. 14 is a sectional view of the major portion of the rotating electric machine during production, according to the embodiment of the present invention.

Furthermore, in an example shown in FIG. 14, the crossover wire EL for connecting the first and second stator coils 114 (U1+) and 114 (U1−) is located on the end face of the coil bobbin 112BO (U1+) in the axial direction of the rotating electric machine, and the bottom of the crossover wire EL is located lower than the outermost layer of coil end.

Figure 15:
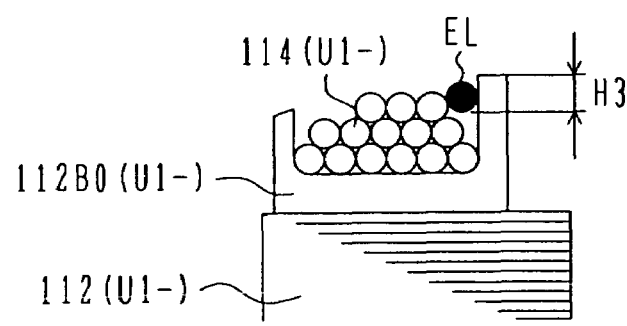
FIG. 15 is a sectional view of the major portion of the rotating electric machine during production, according to the embodiment of the present invention.
Figure 16:
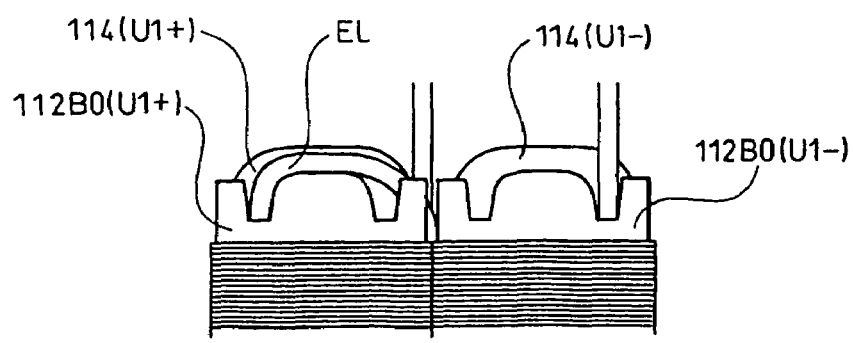
FIG. 16 is a front view of the major portion of the rotating electric machine during production in the example shown in FIG. 14, according to the embodiment of the present invention.

Moreover, in an example shown in FIG. 15, winding is performed so that a gap is provided between the outermost periphery of the outermost layer of the coil end, and a flange of the bobbin 112BO (U1−). Here, the crossover wire EL for connecting the first and second stator coils 114 (U1+) and 114 (U1−) is disposed in this gap, and the bottom of the crossover wire EL is located lower than the upper end of a flange of the bobbin by a height H3.

FIG. 16 is a front view in which, as shown in FIG. 14, the end faces of the coil bobbins 112BO (U1+) and 112BO (U1−) in the axial direction of the rotating electric machine are made lower that the outermost layers of the coils 114 (U1+) and 114 (U−), and in which the crossover wire EL is arranged so as to pass above the end face of the bobbins 112BO (U1−) on the radial outside of the coil 114 (U1+). The bottom of the crossover wire EL becomes lower than the outermost layer of the coil end of coil 114 (U1+), and thereby the height of the undersurface of mounted components such as connection components can be brought close to the height of (the outermost layer of coil end)+(line diameter).

Figures 17A, 17B:
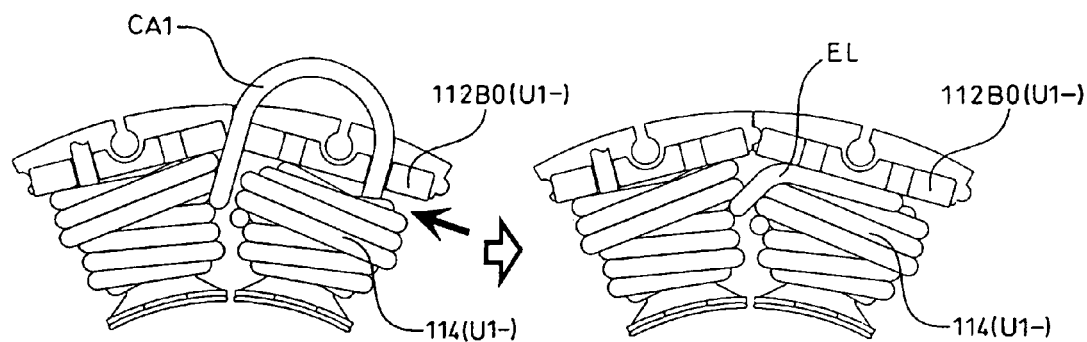
FIGS. 17A and 17B are each a plan view of the rotating electric machine during production in the example shown in FIG. 15, according to the embodiment of the present invention.

FIGS. 17A and 17B are each a front view showing a state during production of the example shown in FIG. 15. As shown in FIG. 17A, it is possible to perform winding so that a gap (position indicated an arrow) is provided between the outermost periphery of the outermost layer of the coil end of second coil 114 (U1−) and a flange of the bobbin 112BO (U1−), and to accommodate the crossover wire EL in this gap as shown in FIG. 17B. In this case, the bottom of the crossover wire EL becomes lower than the outermost layer of coil end, and thereby the height of the undersurface of mounted components such as connection components can be brought close to the height of (the outermost layer of coil end)+(line diameter). Since the crossover wire is accommodated inside the bobbin, the possibility of insulation damage of coils caused by the conveyance and/or assembly of components can be reduced.

The element common among the examples shown in FIGS. 12 to 15 lies, as shown in FIGS. 3 to 11, in that the crossover wire EL is positioned on the inner peripheral side than the outermost periphery of the bobbin, inclusive of the outermost periphery of the bobbin 112BO (U1−), by winding stator coils using the production method wherein continuous winding is performed in a state where the axes of the first and second stator coils are displaced from each other in the axial direction of the stator, and after the crossover wire for connecting the first and second stator coils has been moved onto the coil end of the second stator, the relative positions of both coils as viewed from the coil end side on which the crossover wire lies, are conformed to each other. By virtue of these features, the crossover wire can be shortened, resulting in shortened coil end portion. This, in turn, allows a reduction in the axial length of the rotating electric machine.

Furthermore, increasing the amount of accommodating the surplus length of electric wire in the transition portion enables the last half turn CA1 of the first stator coil 114 (U1+) to be arranged linearly diagonally in slots, with the diagonally opposite corners of the first and second coils used as supports. This allows the crossover wire to be brought in close contact with the coil end of the second stator coil. Since there is no play in the crossover wire EL, the contact between the last half turn CA1 of the first stator coil 114 (U1+) and the second stator coil 114 (U1−) can be perfectly avoided, thereby allowing danger of a short circuit in coils of the same phase to be eliminated.

Herein, descriptions have been made of the structure in which winding is performed in a state where bobbins are installed to the respective T-shaped split back cores. Alternatively, however, the arrangement may be such that two continuously wound coils may be produced by providing the jig with a shaft for inserting a bobbin. Still alternatively, the present invention may be applied to the back core in the rotating electric machine of the type in which the stator is split into a teeth portion and an annular core back portion.

As described above, according to this embodiment, the length of the crossover wire projecting from the coil end is reduced, whereby the axial size of the rotating electric machine can be reduced. Also, since the crossover wire does not pass through the outer periphery of the coil bobbin, this portion can be effectively used as a space for installing legs of connection components or the like.

Next, a second production method for the rotating electric machine of the present embodiment will be described with reference to FIGS. 18 to 21. These examples are effective for the case where the line diameter of a conductor used for stator coils is larger, e.g., 2.3 mm or more.

Figure 18:
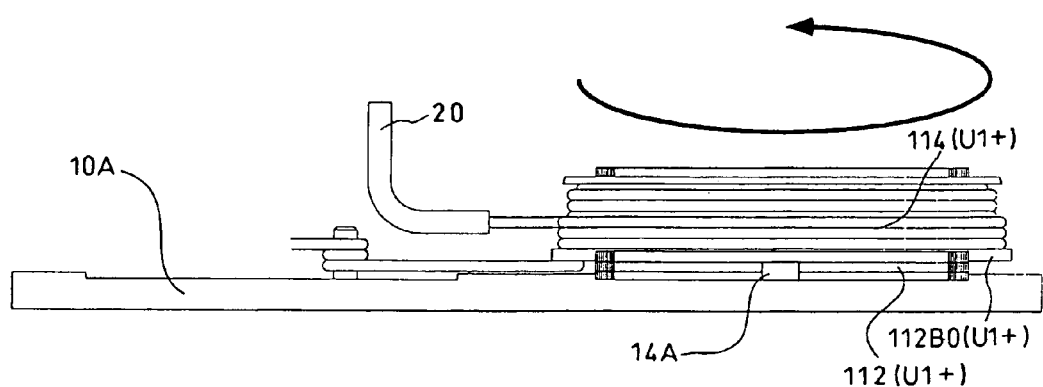
FIG. 18 is a front view of a rotating electric machine according to an embodiment of the present invention, during the production using a second method.
Figure 19:
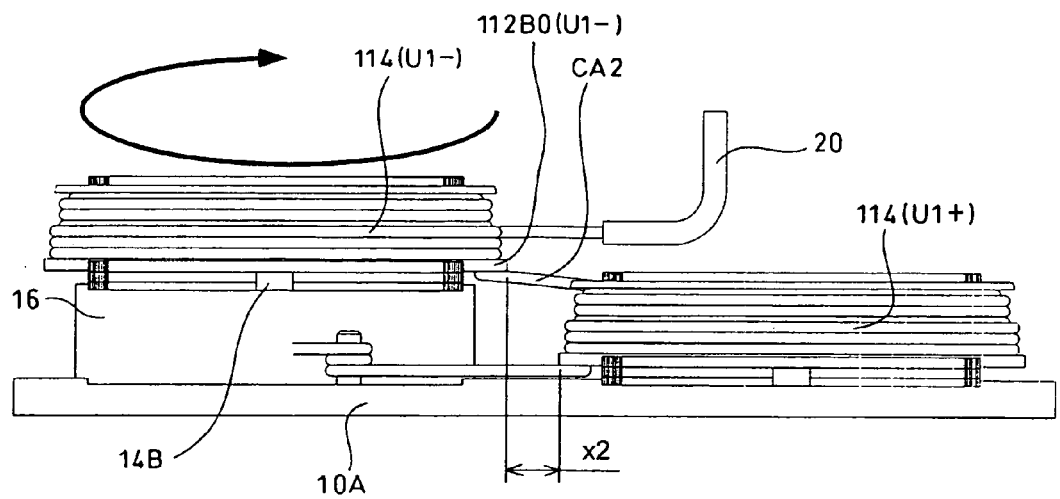
FIG. 19 is a front view of the rotating electric machine according to the embodiment of the present invention, during the production using the second method.
Figure 20:
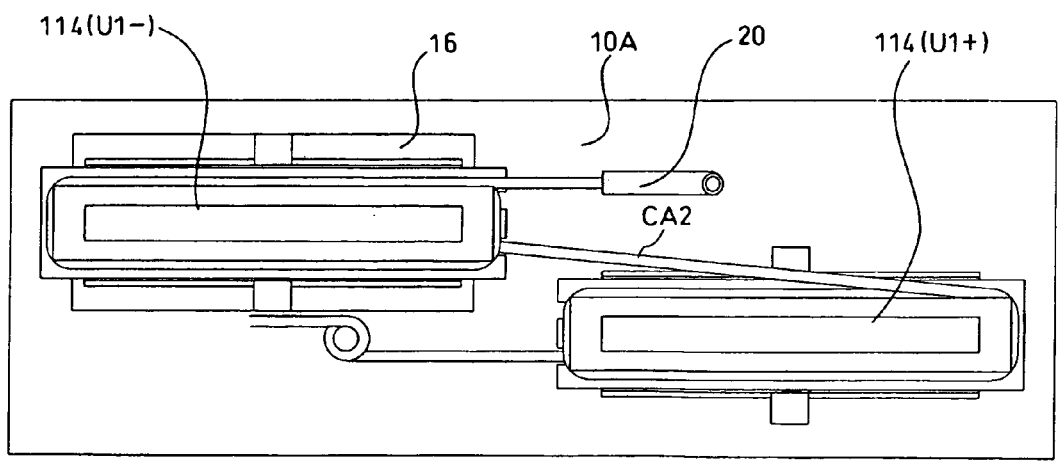
FIG. 20 is a plan view of the rotating electric machine according to the embodiment of the present invention, during the production using the second method.
Figure 21A:
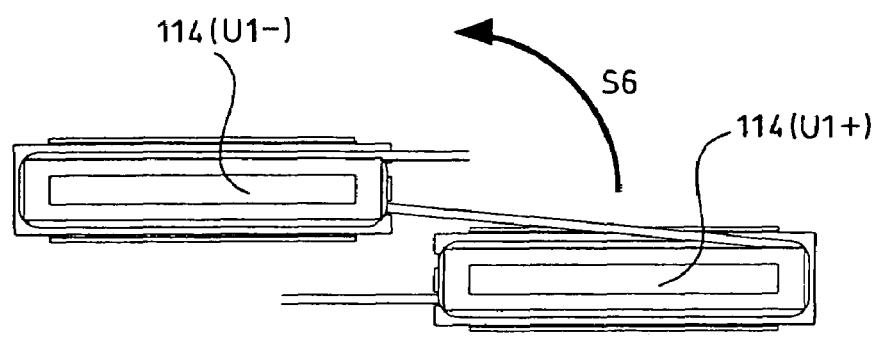
FIGS. 21A and 21B are each a plan view of the rotating electric machine according to the embodiment of the present invention, during the production using the second method.
Figure 21B:
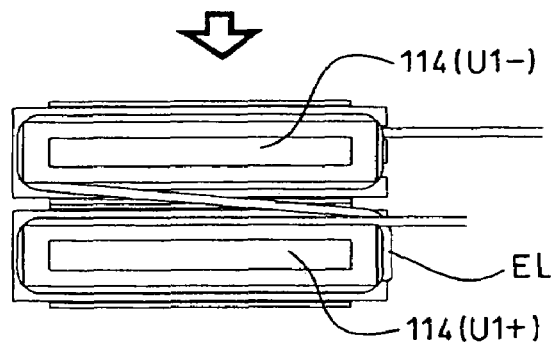

FIGS. 18 and 19 are each a front view of the rotating electric machine according to an embodiment of the present invention, during the production using a second method. FIG. 20 and FIGS. 21A and 21B are each a plan view of a rotating electric machine according to the embodiment of the present invention, during the production using a second method. In FIGS. 18 to 21, the same reference characters as those in FIGS. 1 to 17 designate the same parts.

First, as shown in FIG. 18, the bobbin 112BO (U1+) is mounted to the first back core 112 (U1+), and fixed to the wiring jig 10A by a holding means 14A. Then, the first stator coil 114 (U1+) is wound around the bobbin 112BO (U1+), which has been mounted to the first back core 112 (U1+).

Next, as shown in FIGS. 19 and 20, a spacer 16 is mounted on the wiring jig 10A. Then, the second back core 112 (U1−) is installed onto the jig 10A. Here, the second back core 112 (U1) is equipped with the bobbin 112BO (U1−) in advance. By establishing such a positional relationship, it is possible to displace the relative position of the first stator coils 114 (U1+) relative to the second stator coil 114 (U1−) in the winding axis direction, and simultaneously an arrangement is performed so that coil end sides of the two coil are opposed. The second stator coils 114 (U1−) is wound in the direction opposite to the winding direction of the first stator coils 114 (U1+). Here, by displacing the positions of the two split back cores in the winding axis direction, the nozzle 20 can be prevented from interfering with the first stator coil 114 (U1+).

Then, after the holding means 14A and 14B have been removed, the two coils 114 (U1+) and 114 (U1−) are taken out from the wiring jig 10A, and the positions of the two coils in the direction of winding axis direction are conformed to each other. Since the electric wire CA1 in the transition portion has been wound into the second coil 114 (U1−) from the rear surface of the second bobbin 112BO (U1−) of the second coil 114(U1−), the position of an electric wire CA2 is moved from the rear surface of the bobbin to the bore side.

Next, as shown in FIG. 21A, with respect to the second stator coil 114 (U1+), the position of the first stator coil 114 (U1+) is inverted (180 degrees), and as shown in FIG. 21B, the relative positions of the two coils as viewed from the coil end side on which the crossover wire lies, are conformed to each other. Adjustment of a difference X2 in the distance between the two coils to be fixed to the wiring jig 10A allows the length of crossover wire EL to be set to a desired size.

Regarding the second production method also, descriptions have been made of the structure in which winding is performed in a state where bobbins are installed to the respective T-shaped split back cores, as in the case of the first production method. However, the arrangement may also be such that the jig is provided with a shaft for inserting a bobbin, and that two continuously wound coils without split back core is produced by providing the jig with a shaft. Furthermore, the present invention may also be applied to the back core in the rotating electric machine of type in which the stator is split into a teeth portion and an annular core back portion.

As described above, according to the present embodiment also, the crossover wire EL is positioned on the inner peripheral side than the outermost periphery, inclusive of the outermost periphery of the bobbin 112BO (U1-), by winding stator coils using the production method wherein continuous winding is performed in a state where the axes of the first and second stator coils are displaced from each other in the axial direction of the stator, and after the crossover wire for connecting the first and second stator coils has been moved onto the coil end of the second stator, the relative positions of both coils, as viewed from the coil end side on which the crossover wire lies, are conformed to each other by relatively inverting the positions of the first and second stator coils. By virtue of these features, the crossover wire can be shortened, resulting in shortened coil end portion. This, in turn, allows a reduction in the axial length of the rotating electric machine. Furthermore, since the crossover wire does not pass through the outer periphery of the coil bobbin, this portion can be effectively used as a space for installing legs of connection components or the like.

What is claimed is:

1. A rotating electric machine comprising:
   a stator; and
   a rotor opposed to the stator with a gap therebetween, the stator including:
      a stator core; and
      first and second stator coils having a same shape incorporated into the stator core,
      the stator core being formed by connecting a plurality of split core pieces,
   wherein each of the stator coils is wound around a coil bobbin installed on an outer periphery of a tooth portion of a respective one of the core pieces, by a concentrated winding method;
   and around the tooth portions that are adjacent to each other, continuously winding the respective stator coils that have a same phase and mutually different winding direction,
   wherein the first and the second stator coils are continuously wound in a state where axes of the first and the second stator coils are displaced from each other in an axial direction of the stator, and
   a crossover wire for connecting the first and the second stator coils are moved onto a coil end of the second stator coil, and thereafter, relative positions of the two stator coils, as viewed from a coil end side on which the crossover wire lies, are conformed to each other, wherein the crossover wire does not extend beyond outer peripheries of the first and second stator coils.

2. The rotating electric machine according to claim 1, wherein the crossover wire is located on the coil end of the second stator coil; and
   a bottom of the crossover wire is located lower than an upper end face of the coil bobbin.

3. The rotating electric machine according to claim 1, wherein the crossover wire is located on the coil end of the second stator coil in close contact therewith.

4. The rotating electric machine according to claim 1, wherein the crossover wire is located on an end surface of the coil bobbin of the second stator coil in the axial direction of the rotating electric machine; and
   a bottom of the crossover wire is located lower than the outermost layer of the first stator coil.

5. The rotating electric machine according to claim 1, wherein the crossover wire is located in a gap between an outermost periphery of an outermost layer of the coil end of the second stator coil and a flange of the coil bobbin; and
   a bottom of the crossover wire is located lower than the outermost layer of the second stator coil.

6. A production method for stator coils comprising:
   winding first and second stator coils having a same shape, by a concentrated winding method, around coil bobbins installed on outer peripheries of respective tooth portions of a stator core; and
   around the tooth portions that are adjacent to each other, continuously winding the respective stator coils that have a same phase and mutually different winding direction,
   wherein the first and the second stator coils are continuously wound in a state where axes of the first and the second stator coils are displaced from each other in an axial direction of the stator; and
   a crossover wire for connecting the first and the second stator coils is moved onto a coil end of the second stator coil, and thereafter, relative positions of the two stator coils, as viewed from a coil end side on which the crossover wire lies, are conformed to each other, wherein the crossover wire does not extend beyond outer peripheries of the first and second stator coils.

7. A production method for stator coils comprising:
   winding first and second stator coils having a same shape, by a concentrated winding method, around coil bobbins installed on outer peripheries of respective tooth portions of a stator core; and
   around the tooth portions that are adjacent to each other, continuously winding the respective stator coils that have a same phase and mutually different winding direction,
   wherein the first and the second stator coils are continuously wound in a state where axes of the first and the second stator coils are displaced from each other in an axial direction of the stator; and
   a crossover wire for connecting the first and the second stator coils is moved onto a coil end of the second stator coil, and thereafter, relative positions of the two stator coils, as viewed from a coil end side on which the crossover wire lies, are conformed to each other by relatively inverting positions of the first and the second stator coils, wherein the crossover wire does not extend beyond outer peripheries of the first and second stator coils.

8. An electric power steering motor driven by multiphase alternating current power for outputting steering torque comprising:
   a stator; and
   a rotor opposed to the stator with a gap therebetween, the stator including:
      a stator core; and
      first and second stator coils having a same shape incorporated into the stator core,
      the stator core being formed by connecting a plurality of split core pieces, wherein each of the stator coils is wound around a coil bobbin installed on an outer periphery of a tooth portion of a respective one of the core pieces, by a concentrated winding method;

and around the tooth portions that are adjacent to each other, continuously winding the respective stator coils that have a same phase and mutually different winding direction, wherein the first and the second stator coils are continuously wound in a state where axes of the first and the second stator coils are displaced from each other in an axial direction of the stator; and a crossover wire for connecting the first and the second stator coils is moved onto a coil end of the second stator coil, and thereafter, relative positions of the two stator coils, as viewed from a coil end side on which the crossover wire lies, are conformed to each other, wherein the crossover wire does not extend beyond outer peripheries of the first and second stator coils.

9. A rotating electric machine comprising:

a stator; and a rotor opposed to the stator with a gap therebetween, the stator including:

a stator core; and first and second stator coils having a same incorporated into the stator core, the stator core being formed by connecting a plurality of split core pieces, wherein each of the stator coils is wound around a coil bobbin installed on an outer periphery of a tooth portion of a respective one of the core pieces, by a concentrated winding method;

and around the tooth portions that are adjacent to each other, continuously winding the respective stator coils that have a same phase and mutually different winding direction, wherein the first and the second stator coils are continuously wound in a state where axes of the first and the second stator coils are displaced from each other in an axial direction of the stator; and a crossover wire for connecting the first and the second stator coils is moved onto a coil end of the second stator coil, and thereafter, relative positions of the two stator coils, as viewed from a coil end side on which the crossover wire lies, are conformed to each other by relatively inverting the positions of the first and the second stator coils, wherein the crossover wire does not extend beyond outer peripheries of the first and second stator coils.

10. An electric power steering motor driven by multiphase alternating current power for outputting steering torque comprising:

a stator; and a rotor opposed to the stator with a gap therebetween, the stator including:

a stator core; and first and second stator coils having a same shape incorporated into the stator core, the stator core being formed by connecting a plurality of split core pieces, wherein each of the stator coils is wound around a coil bobbin installed on an outer periphery of a tooth portion of a respective one of the core pieces, by a concentrated winding method;

and around the tooth portions that are adjacent to each other, continuously winding the respective stator coils that have a same phase and mutually different winding direction, wherein the first and the second stator coils are continuously wound in a state where axes of the first and the second stator coils are displaced from each other in an axial direction of the stator; and a crossover wire for connecting the first and the second stator coils is moved onto a coil end of the second stator coil, and thereafter, relative positions of the two stator coils, as viewed from a coil end side on which the crossover wire lies, are conformed to each other by relatively inverting positions of the first and the second stator coils, wherein the crossover wire does not extend beyond outer peripheries of the first and second stator coils.

* * * * *